US010417471B2

(12) United States Patent
Liu et al.

(10) Patent No.: US 10,417,471 B2
(45) Date of Patent: Sep. 17, 2019

(54) BARCODE PROCESSING

(71) Applicant: International Business Machines Corporation, Armonk, NY (US)

(72) Inventors: Su Liu, Austin, TX (US); Peng Hui Jiang, Beijing (CN); Michael Baessler, Neckartenzlingen (DE); Jian Feng Zhang, Xi'an (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/802,770

(22) Filed: Nov. 3, 2017

(65) Prior Publication Data
US 2019/0138777 A1 May 9, 2019

(51) Int. Cl.
*G06K 7/14* (2006.01)
*G06K 19/06* (2006.01)
(52) U.S. Cl.
CPC ......... *G06K 7/1417* (2013.01); *G06K 7/1452* (2013.01); *G06K 19/06037* (2013.01)
(58) Field of Classification Search
CPC ..... G06K 7/1417; G06K 7/1413; G06F 17/00
USPC ............ 235/462.01, 375, 454, 462.09, 462.1
See application file for complete search history.

(56) References Cited

U.S. PATENT DOCUMENTS

| 2008/0110990 | A1* | 5/2008 | Cordery | G07D 7/0043 235/462.1 |
| 2015/0063672 | A1 | 3/2015 | Chang | |
| 2016/0155036 | A1 | 6/2016 | Burkhart et al. | |
| 2016/0196484 | A1 | 7/2016 | Ciavatta | |
| 2016/0283765 | A1* | 9/2016 | Sandtner | G06K 7/1439 |
| 2016/0335608 | A1* | 11/2016 | Balasubramani | G06Q 20/322 |
| 2017/0012974 | A1* | 1/2017 | Sierra | H04L 9/3247 |

FOREIGN PATENT DOCUMENTS

CN 103092847 5/2013

OTHER PUBLICATIONS

Macdonald, S., "Implementation of QR Codes at Indiana University's Fine Arts Library", Art Documentation: Journal of the Art Libraries Society of North America, vol. 31 (fall 2012), Copyright 2012 by the Art Libraries Societies of North America, downloaded from 129.042.208.182 on Feb. 27, 2018, Total 9 pp.

Ray, S., "Information Elements in Quick Response Code of Pharmaceutical Companies in Mumbai—Content Analysis Study", Sep. 2016, Total 45 pp.

Hassanein, M.S., "Secure Digital Documents Using Steganography and QR Code", Department of Computer Science, Brunel University, Nov. 2014, retrieved from the Internet at <URL: http://bura.brunel.ac.uk/bitstream/2438/10619/1/FulltextThesis.pdf>, Total 191 pp.

(Continued)

*Primary Examiner* — Edwyn Labaze
(74) *Attorney, Agent, or Firm* — Konrad Raynes Davda & Victor LLP; Janaki K. Davda

(57) ABSTRACT

Provided are techniques for barcode processing. A barcode is detected. Then the barcode is classified as any of a first class code that needs to be preserved and a second class code that does not need to be preserved. For the barcode classified as the first class code, a content referred to by the barcode is saved.

20 Claims, 3 Drawing Sheets

(56) References Cited

OTHER PUBLICATIONS

ByteScout, "Why QR Code is the Great Choice for your Documents", Copyright 2006-2017, [retrieved on Nov. 1, 2017]. Retrieved from the Internet at <URL: https://bytescout.com/blog/2016/11/qr-code-great-choice-documents.html>, Total 3 pp.

English Abstract for CN103092847, published on May 8, 2013, Total 2 pp.

* cited by examiner

BARCODE PROCESSING

BACKGROUND

Embodiments of the invention relate to data processing, and, more specifically, to processing of barcode information, such as Quick Response (QR) code information.

With the rapid development of information technology, the volume of information grows geometrically. In some cases, a lot of information needs to be preserved for some period of time. Furthermore, barcodes, including Quick Response (QR) codes are very popular nowadays. For example, QR codes are often integrated into documents, emails or advertisements as references. Typically, people cannot read information from the QR codes directly. However, contents referred to by the QR codes are usually meaningful. The contents may be a signature of a person, a link to a web page, a useful document, etc. Also, the contents referred to by the QR codes may change from time to time or may not be accessible sometimes. If only the QR codes themselves are preserved, some QR codes may not be parsed any more, or the original contents referred to by the QR codes may not be retrievable any more as the contents have been changed. This may damage the preservation of information.

SUMMARY

This Summary is provided to introduce barcode processing that is further described herein in the Detailed Description. This summary is not intended to identify key factors or essential features of the claimed subject matter, nor is it intended to be used to limit the scope of the claimed subject matter.

According to one embodiment of the present invention, there is provided a computer-implemented method comprising: detecting, with a processor of a computer, a barcode; classifying the barcode as any of a first class code that needs to be preserved and a second class code that does not need to be preserved; and, in response to the barcode being classified as the first class code, saving a content referred to by the barcode.

According to another embodiment of the present invention, there is provided a computer system. The computer system includes one or more processors, one or more computer-readable memories and one or more computer-readable, tangible storage devices, and includes program instructions, stored on at least one of the one or more computer-readable, tangible storage devices for execution by at least one of the one or more processors via at least one of the one or more memories, to perform operations comprising: detecting a barcode; classifying the barcode as any of a first class code that needs to be preserved and a second class code that does not need to be preserved; and, in response to the barcode being classified as the first class code, saving a content referred to by the barcode.

According to yet another embodiment of the present invention, there is provided a computer program product. The computer program product comprises a computer readable storage medium having program instructions embodied therewith, the program instructions executable by at least one processor to cause the processor to perform: detecting a barcode; classifying the barcode as any of a first class code that needs to be preserved and a second class code that does not need to be preserved; and, in response to the barcode being classified as the first class code, saving a content referred to by the barcode.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

Throughout the drawings, the same or similar reference numerals represent the same or similar elements.

DETAILED DESCRIPTION

Some preferable embodiments will be described in more detail with reference to the accompanying drawings, in which the preferable embodiments of the present disclosure have been illustrated. However, the present disclosure may be implemented in various manners, and thus should not be construed to be limited to the embodiments disclosed herein. Many modifications and variations will be apparent to those of ordinary skill in the art without departing from the scope and spirit of the described embodiments.

The terminology used herein was chosen to best explain the principles of the embodiments, the practical application or technical improvement over technologies found in the marketplace, or to enable others of ordinary skill in the art to understand the embodiments disclosed herein.

Figure 1:
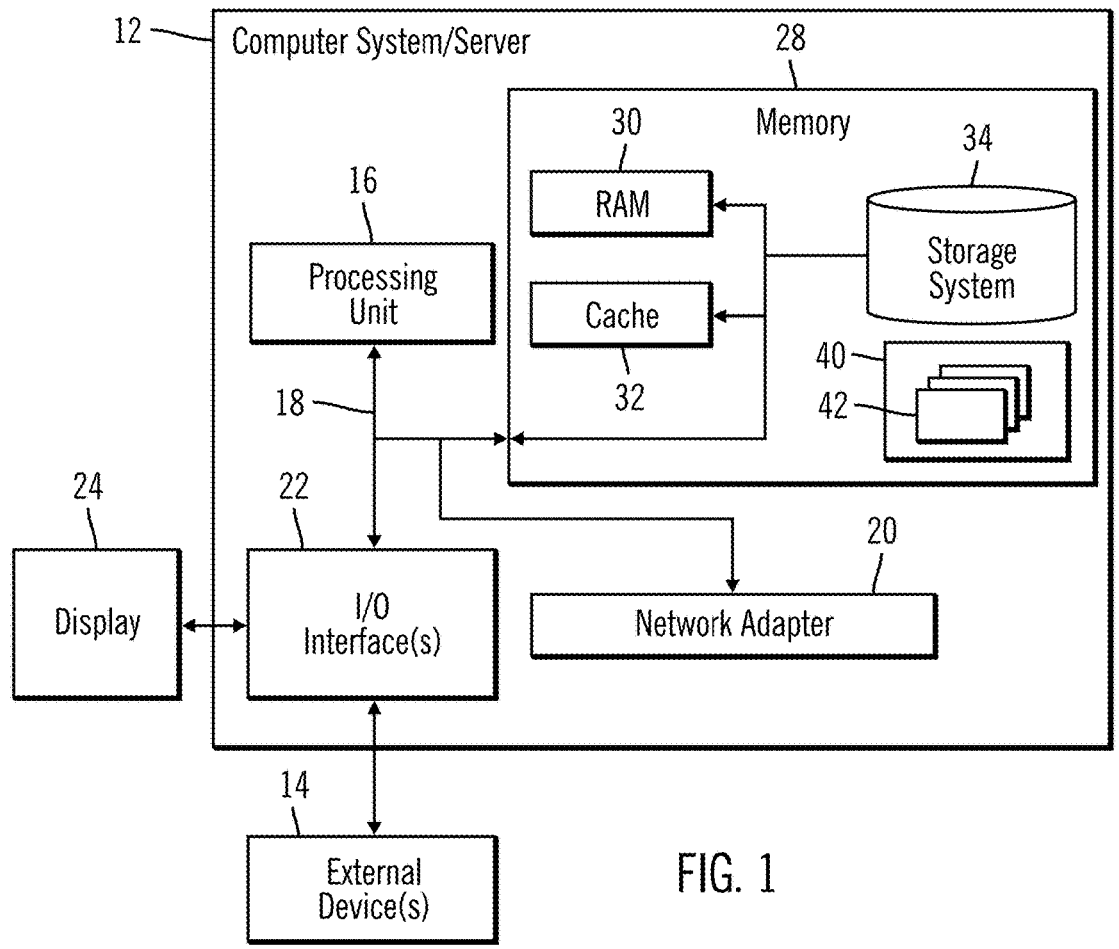
FIG. 1 shows an exemplary computer system which is applicable to implement certain embodiments of the present invention.

Referring now to FIG. 1, in which an exemplary computer system/server 12 which is applicable to implement the embodiments of the present invention is shown. FIG. 1 is also adapted to depict an illustrative example of a portable electronic device, such as a communication device, which is applicable to implement the embodiments of the present invention. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processing unit 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA)

bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

As used herein, the term "includes" and its variants are to be read as open terms that mean "includes, but is not limited to." The term "based on" is to be read as "based at least in part on." The term "one embodiment" is read as "at least one embodiment." The term "another embodiment" is to be read as "at least one other embodiment." Other definitions, explicit and implicit, may be included below.

As mentioned above, the developing of information technology changes people's life in many aspects, and the wide usage of QR codes, is one significant aspect. QR code (abbreviated from Quick Response Code) is a type of matrix barcode (or two-dimensional barcode). A barcode is a machine-readable optical label that contains information. A QR code is machine-readable and uses four standardized encoding modes (numeric, alphanumeric, byte/binary, and kanji) to store data. A QR code may be read by an imaging device, such as a camera. Compared to standard Universal Product Code (UPC) barcodes, a QR code has greater storage capacity. Nowadays a QR code is widely used in many areas, including item identification, document management, product tracking, and general marketing, etc.

It is to be understood that embodiments of the present invention use QR code as an example here, other types of barcodes or codes comprising data readable by an imaging device now known or to be developed may also be used in various embodiments.

Although QR codes are not readable to human beings, the content referred to by a QR code may be readable. However, using a QR code does not always obtain referred content. For example, there may be timestamp information in the QR code. The referred content may be accessed within a specified timeslot. The QR code is not allowed to access the content beyond the specified timeslot. In addition, it is possible that the link for referred content is changed, and the specified content is no longer accessible by the QR code. As such, in both scenarios, the useful referred content of the QR code needs to be preserved in time since the content may be changed or may not be accessible.

Another issue that needs to be addressed is how to preserve QR codes based on the degree of importance. Some QR codes point to a popular web site, and it is not necessary to save this kind of information referred to by the QR code. Furthermore, there is a lot of information identified as spam, and it is not necessary to preserve content referred to by the QR codes comprised in such spam. However, some other QR codes refer to important business information or other useful information, and embodiments save such types of information to avoid problems with the link becoming inaccessible or the content changing in the future.

In order to at least in part solve the above mentioned and other potential problems, according to embodiments of the present disclosure, a new solution for classifying QR codes and saving necessary contents referred to by the QR codes is provided.

Figure 2:
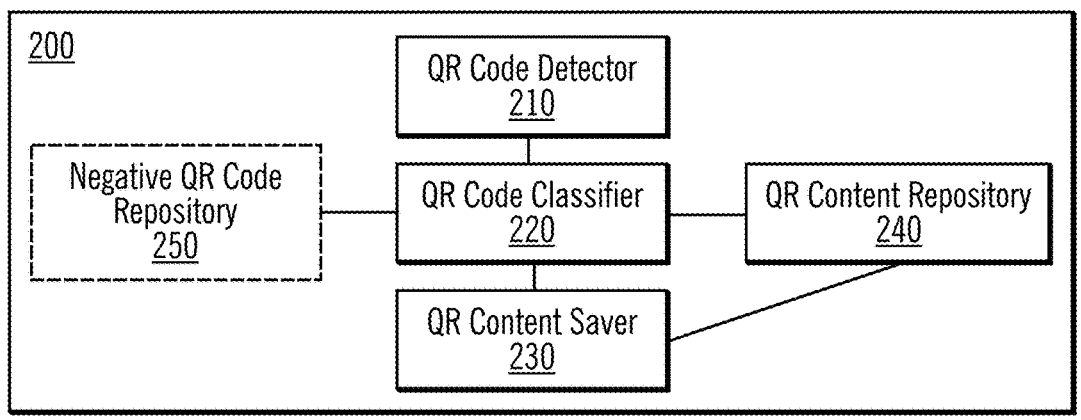
FIG. 2 is a schematic diagram of a QR code processing system in accordance with certain embodiments of the present invention.

FIG. 2 shows a schematic diagram of a QR code processing system 200 in accordance with certain embodiments of the present invention. The QR code processing system 200 may comprise a QR code detector 210, a QR code classifier 220, a QR content saver 230, and a QR content repository 240. Optionally, the QR code processing system 200 may include a negative QR code repository 250.

The QR code detector 210 may recognize a QR code in a document. It is to be understood that a "document" herein refers to any kind of carrier comprising QR codes, such as a word processing document, an email, a poster, etc. For example, the document may be a physical, printed document or an electronic document.

Then, the recognized QR code is sent to QR code classifier 220. The QR code classifier 220 determines whether the QR code should be classified as a first class code or as a second class code. Hereafter, the QR code that is meaningful and/or needs to be preserved is be classified as the first class code, otherwise the QR codes is classified as the second class code. In other embodiments, the QR code may be classified as the first class code or the second class code by a user directly. In further embodiments, some pre-defined rules are used by the QR code classifier 220 to classify the QR codes. These rules may be pre-defined by the user directly or determined by the QR code processing system 200 based on previous QR code classification. For example, a QR code referring to a business card may be classified as the first class code directly.

Optionally or additionally, the QR code processing system 200 further comprises a negative QR code repository 250. For example, a QR code in a document reported as spam may be saved in the negative QR code repository 250. As such, another recognized QR code matching a negative QR code in the negative QR code repository 250 (e.g., the recognized QR code is the same as a QR code in the negative QR code repository 250) may be classified as the second class code. In a yet further embodiment, a total points of a QR code may be determined based on several factors and corresponding weights of the factors. A total points value may be used in determining whether a QR code is the first class code or the second class code. For example, the total points may be calculated using the following equation:

$$\text{Total points}=F1*W1+F2*W2+F3*W3+F4*W4+F5*W5+F6*W6$$

For the total points equation, W1 to W6 refer to weights of each factor F1 to F6 respectively. The weights may be assigned to W1 to W6 and adjusted depending on importance of the degree of each factor.

In certain embodiments, F1 refers to a source of the QR code (a private location or a public location). The private location may be an email, a direct message, a protected document, etc. The public location may be a public website, a social network, etc. For example, a QR code from the private location may be more meaningful and needs to be preserved. As such, a proper value may be assigned to W1 for F1, such as a weight of 1 (one) for the QR code that is from a private location, and a weight of 0 (zero) for the QR code that is from a public location. It is to be understood for those skilled in the art that the value of W1 for F1 may be set as another value too.

In certain embodiments, F2 refers to a generator of the QR code. F2 represents who generated the QR code, such as a person or a company. As such, a proper value may be assigned to W2 for F2, such as a weight of 1 (one) for the QR code generated by a person, and a weight of 0 (zero) for the QR code generated by a company. It is to be understood for those skilled in the art that the value of W2 for F2 may also be set as another value too.

In certain embodiments, F3 refers to classification of a context surrounding the QR code. Usually, the QR code may be attached in a document. F3 may be used to represent this classification of the context surrounding the QR code. Semantic recognition technology may be used to recognize a context surrounding the QR code. In an embodiment, W3 for F3 for the QR code surrounded by a context, such as an advertisement, may be set as a low value, and W3 for F3 for the QR code surrounded by a context, such as non-advertisement information, may be set as a high value. It is to be understood for those skilled in the art that the rules of the value of W3 for F3 may be determined based on a classification purpose of the user.

In certain embodiments, F4 refers to a frequency of occurrence of the QR code. F4 represents how often the QR code is detected by the QR code detector 210. When the QR code detector 210 detects a new QR code, a frequency of occurrence of the detected QR code is calculated. For example, the more frequently the QR code is detected by the QR code detector 210, the lower the value of W4 for F4 may be. Similarly, the less frequently the QR code is detected by the QR code detector 210, the higher the value of W4 for F4 may be. It is to be understood that the value of W4 of F4 may also be set as another value depending on a usage purpose of the user.

In certain embodiments, F5 refers to a frequency of occurrence of a content pointed to by the QR code. F5 represents how often the content pointed to by the QR code occurs. W5 for F5 may be calculated based on the QR content repository 240. For example, the more frequently the content occurs, the lower the value of W5 for F5 may be. Similarly, the less frequently the content occurs, the higher the value of W5 for F5 may be. It is to be understood that the value of W5 for F5 may also be set as other values depending on a usage purpose of the user.

In certain embodiments, F6 refers to a changing frequency of a content pointed to by the QR code. The QR content repository 240 may also be used to keep changing history of the content, and the changing frequency of the content may be calculated using the changing history. For example, the more frequently the content changes, the higher the value of W6 for F6 may be. Similarly, the less frequently the content changes, the lower the value of W6 for F6 may be.

With embodiments, the total points of the QR code may be compared with a pre-defined threshold, and the QR code with the total points exceeding the threshold may be classified as the first class code. In certain embodiments, the QR code with the total points not exceeding the threshold (i.e., less than or equal to the threshold) may be classified as the second class code.

It is to be understood for those skilled in the art that there may be other factors depending on the consideration of the importance of the QR code, and the weight of the factors may be set as other values depending on the specific usage scenario. In certain embodiments, the weight of each factor and the threshold of the total points may be adjusted using machine learning technology with the expansion of a QR code database to get appropriate values. It is to be understood that there may be other ways to adjust the weight of each factor and the threshold of the total points.

Then, for the QR codes classified as the first class code, the QR content saver 230 retrieves the corresponding content referred to by the QR code as the first class code and saves the content into the QR content repository 240. In further embodiments, the QR code and/or the link to the original document comprising the QR code may be saved with the content referred to by the QR code into the QR content repository 240. In yet further embodiments, the link of the address of the saved QR content may be added to the original document comprising the QR code.

In additional embodiments, the QR code classifier 220 checks the QR codes stored in the QR content repository 240 regularly or on a user's demand. For the QR code that complies with the pre-defined rules, such as the QR code referring to a business card, the QR code may be classified as the first class code. For the QR code that matches a QR code in the negative QR code repository 250, the QR code may be classified as the second class code and deleted from the QR content repository 240. In further embodiments, if the total points of the QR code is less than or equal to the threshold, the QR code may be classified as the second class code and deleted from the QR content repository 240. Additionally or optionally, for the QR code still classified as the first class code, the content referred to by the QR code may be retrieved again and saved with the previous content retrieved for that QR code in the QR content repository 240. In certain embodiments, it is determined whether the new content is different from the previous content referred to by the QR code, and, if the new content is different from the previous content, the new content is retrieved and saved with the previous content. In such embodiments, the content of the QR code may be retrieved by reading the QR code saved in the QR content repository 240.

In yet further embodiments, one or more QR codes may be considered as "very meaningful" and classified as a third class code. A second threshold may be used here, and the QR code with the total points exceeding the second threshold may be classified by the QR code classifier 220 as the third class code. Furthermore, some pre-defined rules may be used by the QR code classifier 220 to classify the QR code. For example, the QR code referring to a particular business card may be classified as the third class code directly. In a further embodiment, the QR code may be classified as the third class code by the user directly. Also, the third class code may be re-checked by the QR code classifier 220 more frequently than the first class code.

Figure 3:
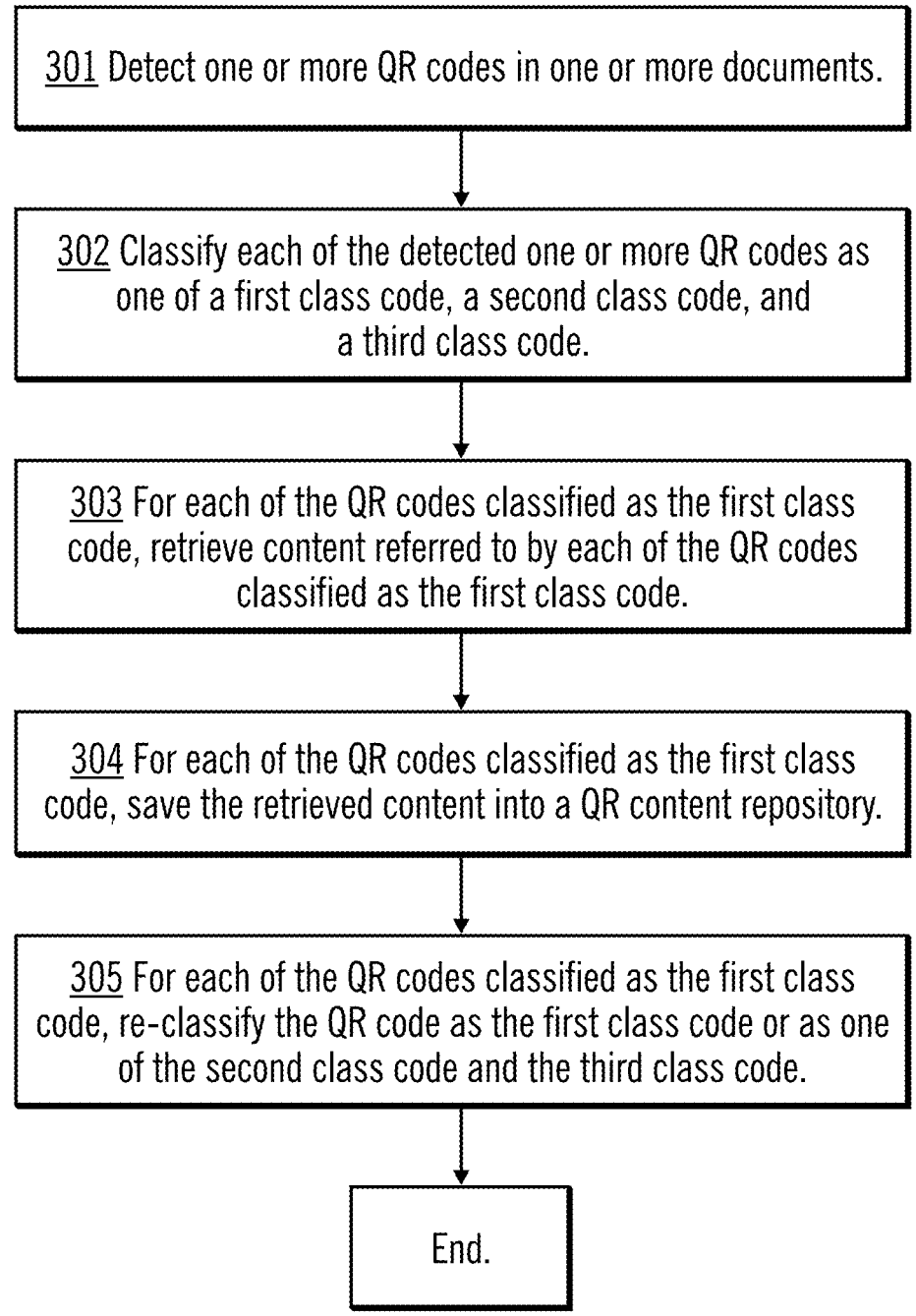
FIG. 3 is a flowchart of operations for processing a QR code in accordance with certain embodiments of the present invention.

FIG. 3 is a flowchart of operations for processing a QR code in accordance with certain embodiments of the present invention. Control starts at block 301 with the QR code detector 210 detecting one or more QR codes included in one or more documents. In block 302, the QR code classifier 220 classifies each of the detected one or more QR codes as one of a first class code, a second class code, and a third class code. The operations for classifying the QR code are further described with reference to FIG. 4 below.

Figure 4:
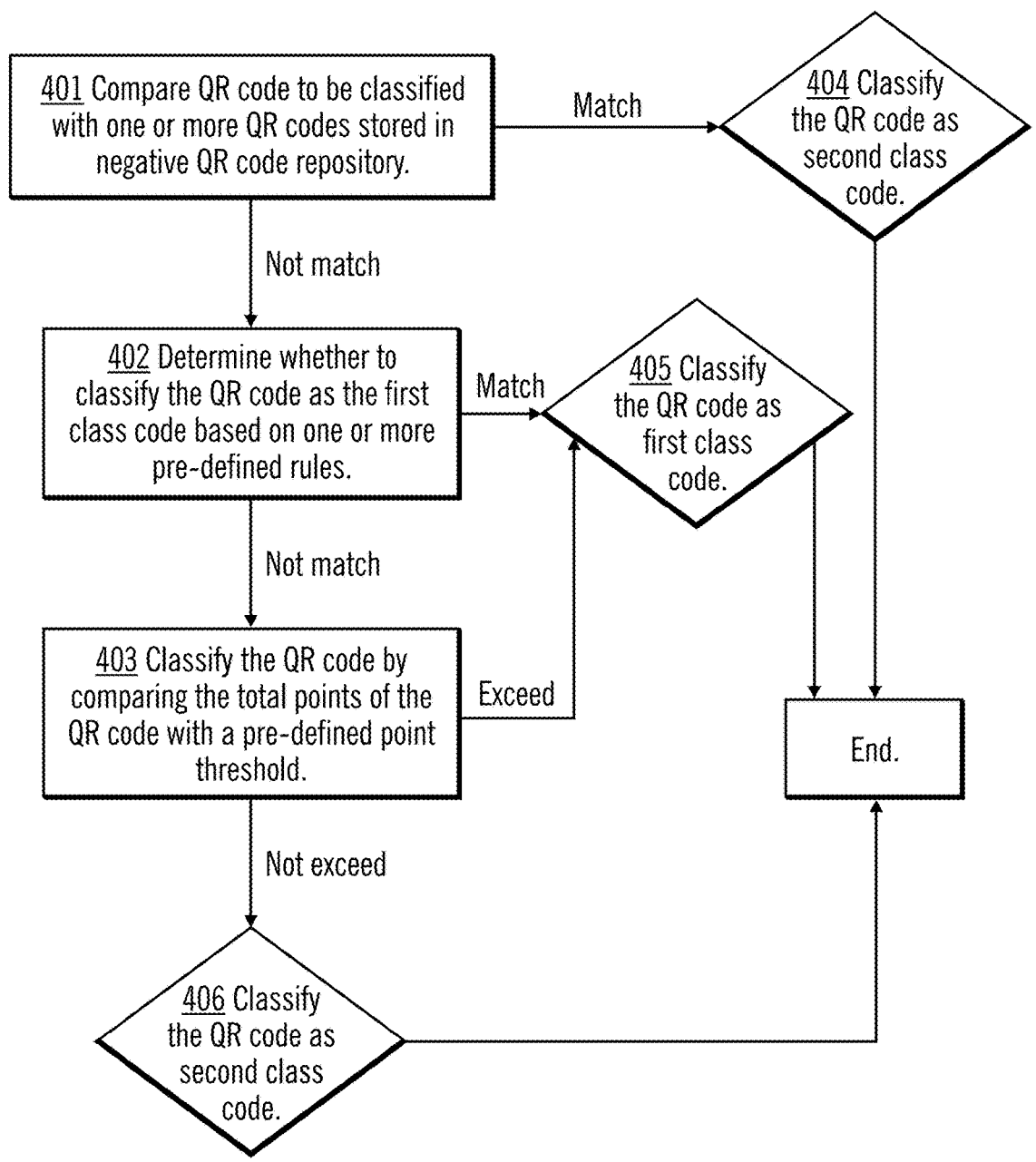
FIG. 4 is a flowchart of operations for classifying a QR code in accordance with certain embodiments of the present invention.

FIG. 4 is a flowchart of operations for classifying a QR code in accordance with certain embodiments of the present invention. Control begins at block 401 with the QR code classifier 220 comparing a QR code to be classified with one or more QR codes in the negative QR code repository 250. If the QR code to be classified matches a negative QR code stored in the negative QR code repository 250, processing continues to block 404, otherwise, processing continues to block 402. In block 404, the QR code classifier 220 classifies the QR code as the second class code and processing ends.

If the QR code to be classified does not match any negative QR code stored in the negative QR code repository 250, processing continues to block 402. In block 402, the QR code classifier 220 determines whether to classify the QR code as the first class code based on one or more pre-defined rules. If the QR code is classified as the first class code, processing continues to block 405, otherwise, processing continues to block 403.

In one embodiment, the one or more pre-defined rules may be defined by the user directly or determined by the QR code processing system 200 based on previous QR code classification. For example, the QR code referring to telephone or address information may be classified as the first class code directly. In one embodiment, a QR code may be determined as referring to a business card comprising telephone and/or address information by analyzing the context surrounding the QR code using semantic techniques. In an alternative embodiment, the QR content referred to by the QR code may be retrieved, and the corresponding QR code may be classified as the first class code if the QR content comprises telephone number, address or other related information. In some further embodiments, the QR code referring to other information, such as post information or a useful document, may be classified as the first class code directly depending on the importance to the user.

In block 402, if the QR code classifier 220 classifies the QR code as the first class code, processing continues to block 405. In block 405, the QR code is classified as the first class code and processing ends.

In block 402, if the QR code classifier 220 does not classify the QR code as the first class code, processing continues to block 403. In block 403, the QR code classifier 220 classifies the QR code by comparing the total points of the QR code with a pre-defined point threshold. If the total points exceed the threshold, processing continues to block 405, otherwise, processing continues to block 406. In block 405, the QR code classifier 220 classifies the QR code as the first class code and processing ends. In block 406, the QR code classifier 220 classifies the QR code as the second class code and processing ends.

In other embodiments, the QR code classifier 220 may classify the QR code as a third class code based on one or more other pre-defined rules and/or based on another threshold.

The total points of a QR code may be determined based on several factors and the corresponding weights. In one embodiment, the total points may be calculated using the following equation:

$$\text{Total points} = F1*W1 + F2*W2 + F3*W3 + F4*W4 + F5*W5 + F6*W6$$

For the total points equation, W1 to W6 refer to weights of each factor F1 to F6 respectively. The weights may be assigned to W1 to W6 and adjusted depending on importance of the degree of each factor.

In certain embodiments, F1 refers to a source of the QR code (a private location or a public location). The private location may be an email, a direct message, a protected document, etc. The public location may be a public website, a social network, etc. For example, a QR code from the private location may be more meaningful and needs to be preserved. As such, a proper value may be assigned to W1 for F1, such as a weight of 1 (one) for the QR code that is from a private location, and a weight of 0 (zero) for the QR code that is from a public location. It is to be understood for those skilled in the art that the value of W1 for F1 may be set as another value too.

In certain embodiments, F2 refers to a generator of the QR code. F2 represents who generated the QR code, such as a person or a company. As such, a proper value may be assigned to W2 for F2, such as a weight of 1 (one) for the QR code generated by a person, and a weight of 0 (zero) for the QR code generated by a company. It is to be understood for those skilled in the art that the value of W2 for F2 may also be set as another value too.

In certain embodiments, F3 refers to classification of a context surrounding the QR code. Usually, the QR code may be attached in a document. F3 may be used to represent this classification of the context surrounding the QR code. Semantic recognition technology may be used to recognize a context surrounding the QR code. In an embodiment, W3 for F3 for the QR code surrounded by a context, such as an advertisement, may be set as a low value, and W3 for F3 for the QR code surrounded by a context, such as non-advertisement information, may be set as a high value. It is to be understood for those skilled in the art that the rules of the value of W3 for F3 may be determined based on a classification purpose of the user.

In certain embodiments, F4 refers to a frequency of occurrence of the QR code. F4 represents how often the QR code is detected by the QR code detector 210. When the QR code detector 210 detects a new QR code, a frequency of occurrence of the detected QR code is calculated. For example, the more frequently the QR code is detected by the QR code detector 210, the lower the value of W4 for F4 may be. Similarly, the less frequently the QR code is detected by the QR code detector 210, the higher the value of W4 for F4 may be. It is to be understood that the value of W4 of F4 may also be set as another value depending on a usage purpose of the user.

In certain embodiments, F5 refers to a frequency of occurrence of a content pointed to by the QR code. F5 represents how often the content pointed to by the QR code occurs. W5 for F5 may be calculated based on the QR content repository 240. For example, the more frequently the content occurs, the lower the value of W5 for F5 may be. Similarly, the less frequently the content occurs, the higher the value of W5 for F5 may be. It is to be understood that the value of W5 for F5 may also be set as other values depending on a usage purpose of the user.

In certain embodiments, F6 refers to a changing frequency of a content pointed to by the QR code. The QR content repository 240 may also be used to keep changing history of the content, and the changing frequency of the content may be calculated using the changing history. For example, the more frequently the content changes, the higher the value of W6 for F6 may be. Similarly, the less frequently the content changes, the lower the value of W6 for F6 may be.

With embodiments, the total points of the QR code may be compared with a pre-defined threshold, and the QR code with the total points exceeding the threshold may be classified as the first class code. In certain embodiments, the QR code with the total points not exceeding the threshold (i.e., less than or equal to the threshold) may be classified as the second class code.

It is to be understood for those skilled in the art that there may be other factors depending on the consideration of the importance of the QR code, and the weight of the factors may be set as other values depending on the specific usage scenario. In certain embodiments, the weight of each factor and the threshold of the total points may be adjusted using machine learning technology with the expansion of a QR code database to get appropriate values. It is to be understood that there may be other ways to adjust the weight of each factor and the threshold of the total points.

Although the blocks 401 to 403 shown in FIG. 4 are in sequence, it is to be noted that the relationship of the timings of the blocks 401 to 403 are not limited thereto but may be arbitrary. For example, it is also possible to perform the block 403 prior to the block 402, or any one of blocks 401 to 403 may be skipped.

In a further embodiment, some QR codes may be classified as the third class code. A second threshold may be used here, and the QR code with the total points exceeding the second threshold may be classified as the third class code. Furthermore, some pre-defined rules may be used to classify the QR code as the third class code. For example, the QR code referring to a particular business card may be classified as the third class code directly. In a further embodiment, the QR code may be classified as the third class code by the user directly.

Now refer back to FIG. 3, in block 303, for each of the QR codes classified as the first class code, the QR content saver 230 retrieves the content referred to by that QR code and the address of the original one or more documents including the QR codes. In block 304, for each of the QR codes classified as the first class code, the QR content saver 230 saves the content referred to by the QR code into the QR content repository 240. In a further embodiment, the QR code and/or the address of the one or more original documents comprising the QR codes as first class code may be saved with the content referred to by the QR code) in the QR content repository 240. Optionally or additionally, the address of the saved QR content may be added to the one or more original documents including the QR code.

In a further embodiment, in block 305, for each of the QR codes classified as the first class code, the QR code classifier 220 re-classifies the QR code (that was previously classified as the first class code) as the first class code or as one of the second class code and the third class code. The processing of block 305 may be performed periodically or initiated by user on demand. In block 305, the QR codes that are classified as the first class code previously may be checked again. In one embodiment, the QR code classified as the first class code previously may be compared with the negative QR codes in the negative QR code repository 250, and may be classified as second class code and removed from the QR content repository 240 if matching. For the QR code complying to the pre-defined rules, such as the QR code referring to a business card, the QR code may be still classified as the first class code. In an alternative embodiment, the total points of the QR code classified as the first class code previously may be calculated again, and for the QR code with a new total points less than the threshold, the QR code classifier 220 may classify the QR code as the second class code and executed with necessary action then. In addition or alternatively, the content referred to by the QR code still classified as the first class code may be retrieved again, and may be preserved with the previous content in the QR content repository 240 if it is different from the previously preserved content. In a further embodiment, the QR codes classified as the third class code may be re-checked by the QR code classifier 220 more frequently than the QR codes classified as the first class code.

By this way, the QR code comprised in documents may be classified. Also, the content of the QR code that is useful or meaningful may be preserved in time. At the same time, the QR code referring to an unnecessary content does not need to be preserved. In this manner, valuable information may be preserved well without extra cost of storage space and time.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   detecting a barcode that refers to a content with a link;
   classifying the barcode as any of a first class code that indicates that the content referred to by the barcode needs to be preserved and a second class code that indicates that the content referred to by the barcode does not need to be preserved; and
   in response to the barcode being classified as the first class code,
      retrieving the content referred to by the barcode using the link; and
      saving the barcode and the content referred to by the barcode.

2. The computer-implemented method of claim 1, further comprises:

saving an address of the saved content referred to by the barcode being classified as the first class code into an original document comprising the barcode.

3. The computer-implemented method of claim 1, further comprises:
re-classifying the barcode as any of the first class code and the second class code;
in response to the barcode being classified as the first class code, saving a new content referred to by the barcode; and
in response to the barcode being classified as the second class code, deleting the saved content referred to by the barcode.

4. The computer-implemented method of claim 1, further comprising:
in response to the barcode complying to a predefined rule, classifying the barcode as the first class code.

5. The computer-implemented method of claim 1, further comprising:
in response to the barcode matching a barcode reported as a spam, classifying the barcode as the second class code.

6. The computer-implemented method of claim 1, further comprising:
calculating a total points of the barcode; and
in response to the total points of the barcode exceeding a pre-defined threshold, classifying the barcode as first class barcode.

7. The computer-implemented method of claim 1, wherein the barcode is a Quick Response (QR) code.

8. A computer system, comprising:
one or more processors, one or more computer-readable memories and one or more computer-readable, tangible storage devices; and
program instructions, stored on at least one of the one or more computer-readable, tangible storage devices for execution by at least one of the one or more processors via at least one of the one or more memories, to perform operations comprising:
detecting a barcode that refers to a content with a link;
classifying the barcode as any of a first class code that indicates that the content referred to by the barcode needs to be preserved and a second class code that indicates that the content referred to by the barcode does not need to be preserved; and
in response to the barcode being classified as the first class code,
retrieving the content referred to by the barcode using the link; and
saving the barcode and the content referred to by the barcode.

9. The computer system of claim 8, wherein the operations further comprise:
saving an address of the saved content referred to by the barcode being classified as the first class code into an original document comprising the barcode.

10. The computer system of claim 8, wherein the operations further comprise:
re-classifying the barcode as any of the first class code and the second class code;
in response to the barcode being classified as the first class code, saving a new content referred to by the barcode; and
in response to the barcode being classified as the second class code, deleting the saved content referred to by the barcode.

11. The computer system of claim 8, wherein the operations further comprise:
in response to the barcode complying to a predefined rule, classifying the barcode as the first class code.

12. The computer system of claim 8, wherein the operations further comprise:
in response to the barcode matching a barcode reported as a spam, classifying the barcode as the second class code.

13. The computer system of claim 8, wherein the operations further comprise:
calculating a total points of the barcode; and
in response to the total points of the barcode exceeding a pre-defined threshold, classifying the barcode as the first class code.

14. The computer system of claim 8, wherein the barcode is a Quick Response (QR) code.

15. A computer program product, comprising a computer readable storage medium having program instructions embodied therewith, the program instructions executable by at least one processor to cause the processor to perform:
detecting a barcode that refers to a content with a link;
classifying the barcode as any of a first class code that indicates that the content referred to by the barcode needs to be preserved and a second class code that indicates that the content referred to by the barcode does not need to be preserved; and
in response to the barcode being classified as the first class code,
retrieving the content referred to by the barcode using the link; and
saving the barcode and the content referred to by the barcode.

16. The computer program product of claim 15, wherein the program instructions are further executable by the at least one processor to cause the processor to perform:
saving an address of the saved content referred to by the barcode being classified as the first class code into an original document comprising the barcode.

17. The computer program product of claim 15, wherein the program instructions are further executable by the at least one processor to cause the processor to perform:
re-classifying the barcode as any of the first class code and the second class code;
in response to the barcode being classified as the first class code, saving a new content referred to by the barcode; and
in response to the barcode being classified as the second class code, deleting the saved content referred to by the barcode.

18. The computer program product of claim 15, he program instructions are further executable by the at least one processor to cause the processor to perform:
in response to the barcode complying to a predefined rule, classifying the barcode as the first class code.

19. The computer program product of claim 15, he program instructions are further executable by the at least one processor to cause the processor to perform:
in response to the barcode matching a barcode reported as a spam, classifying the barcode as the second class code.

20. The computer program product of claim 15, he program instructions are further executable by the at least one processor to cause the processor to perform:
calculating a total points of the barcode; and in response to the total points of the barcode exceeding a pre-defined threshold, classifying the barcode as the first class code.

\* \* \* \* \*